US012132394B2

(12) United States Patent
Katsukura et al.

(10) Patent No.: US 12,132,394 B2
(45) Date of Patent: Oct. 29, 2024

(54) CONTROLLER OF POWER CONVERSION DEVICE

(71) Applicant: TMEIC Corporation, Chuo-ku (JP)

(72) Inventors: Tomoya Katsukura, Tokyo (JP); Issei Fukasawa, Tokyo (JP)

(73) Assignee: TMEIC Corporation, Chuo-ku (JP)

( * ) Notice: Subject to any disclaimer, the term of this patent is extended or adjusted under 35 U.S.C. 154(b) by 146 days.

(21) Appl. No.: 17/755,816

(22) PCT Filed: Oct. 23, 2020

(86) PCT No.: PCT/JP2020/039937
§ 371 (c)(1),
(2) Date: May 9, 2022

(87) PCT Pub. No.: WO2022/085187
PCT Pub. Date: Apr. 28, 2022

(65) Prior Publication Data
US 2022/0393569 A1 Dec. 8, 2022

(51) Int. Cl.
*H02M 1/12* (2006.01)
*H02M 1/00* (2006.01)
(Continued)

(52) U.S. Cl.
CPC ........... *H02M 1/12* (2013.01); *H02M 1/0009* (2021.05); *H02M 1/14* (2013.01); *H02M 7/48* (2013.01)

(58) Field of Classification Search
CPC ......... H02M 1/12; H02M 1/0009; H02M 7/48
See application file for complete search history.

(56) References Cited

U.S. PATENT DOCUMENTS

| 7,031,176 B2 * | 4/2006 | Kotsopoulos | H02M 7/53873 |
| | | | 363/131 |
| 8,796,884 B2 * | 8/2014 | Naiknaware | H02M 7/4807 |
| | | | 307/151 |

(Continued)

FOREIGN PATENT DOCUMENTS

| JP | 6-348353 A | 12/1994 |
| JP | 10-295083 A | 11/1998 |

(Continued)

OTHER PUBLICATIONS

Indian Office Action issued Nov. 9, 2023 in Indian Patent Application No. 202217024288, 6 pages.

(Continued)

*Primary Examiner* — Thienvu V Tran
*Assistant Examiner* — Yahveh Comas Torres
(74) *Attorney, Agent, or Firm* — Oblon, McClelland, Maier & Neustadt, L.L.P.

(57) ABSTRACT

A controller of a power conversion device including a power converter connected between a direct current (DC) power supply and an alternating current (AC) power supply, includes: a damping control term calculation unit configured to calculate a value of pulsation of a DC voltage applied between the DC power supply and the power converter, or pulsation of a DC current flowing between the DC power supply and the power converter; and a current control unit configured to output, to the power converter, a command value for adjusting the power of the power converter so that a pulsation component corresponding to the pulsation value calculated by the damping control term calculation unit is reduced in accordance with a command value based on the value calculated by the damping control term calculation unit. The power conversion device can reduce resonance without including a damping resistor.

1 Claim, 10 Drawing Sheets

(51) Int. Cl.
  *H02M 1/14*   (2006.01)
  *H02M 7/48*   (2007.01)

(56) References Cited

U.S. PATENT DOCUMENTS

| | | | | |
|---|---|---|---|---|
| 9,263,895 | B2* | 2/2016 | Naiknaware | H02M 7/42 |
| 11,218,107 | B2* | 1/2022 | Yasumoto | H02M 7/53871 |
| 2009/0160259 | A1* | 6/2009 | Naiknaware | H02M 7/4807 |
| | | | | 307/82 |
| 2010/0033996 | A1* | 2/2010 | Kono | H02M 7/48 |
| | | | | 363/37 |
| 2014/0232309 | A1* | 8/2014 | Zhou | H02P 21/06 |
| | | | | 318/400.02 |
| 2015/0117067 | A1* | 4/2015 | Naiknaware | H02M 3/33546 |
| | | | | 363/21.04 |
| 2015/0256095 | A1* | 9/2015 | Ohta | H02P 21/0003 |
| | | | | 363/37 |
| 2016/0308465 | A1* | 10/2016 | Yoo | H02M 7/5395 |
| 2019/0052210 | A1* | 2/2019 | Li | F25B 31/02 |
| 2020/0036316 | A1* | 1/2020 | Yasumoto | H02P 27/08 |

FOREIGN PATENT DOCUMENTS

| | | | |
|---|---|---|---|
| JP | 11-164481 A | 6/1999 | |
| JP | 6343037 B1 * | 6/2018 | F25B 31/02 |
| JP | 2020-48361 A | 3/2020 | |
| WO | WO-2018061546 A1 * | 4/2018 | H02M 7/48 |
| WO | WO-2019163341 A1 * | 8/2019 | H02P 6/12 |

OTHER PUBLICATIONS

International Search Report and Written Opinion mailed on Nov. 24, 2020 in PCT/JP2020/039937, filed on Oct. 23, 2020, 6 pages.

* cited by examiner

CONTROLLER OF POWER CONVERSION DEVICE

FIELD

The present disclosure relates to a controller of a power conversion device.

BACKGROUND

PTL 1 discloses a power conversion device. The power conversion device reduces resonance that occurs in a circuit.

CITATION LIST

Patent Literature

[PTL 1] JP 2020-048361 A

SUMMARY

Technical Problem

However, the power conversion device described in PTL 1 includes a damping resistor in the circuit. Hence a large loss occurs due to the damping resistor.

The present disclosure has been made in order to solve the problem described above. An object of the present disclosure is to provide a controller of a power conversion device that can reduce resonance without including a damping resistor.

Solution to Problem

A controller of a power conversion device according to the present disclosure, the power conversion device including a power converter connected between a direct current (DC) power supply and an alternating current (AC) power supply, includes: a damping control term calculation unit configured to calculate a value of pulsation of a DC voltage applied between the DC power supply and the power converter, or pulsation of a DC current flowing between the DC power supply and the power converter; and a current control unit configured to output, to the power converter, a command value for adjusting the power of the power converter so that a pulsation component corresponding to the pulsation value calculated by the damping control term calculation unit is reduced in accordance with a command value based on the value calculated by the damping control term calculation unit.

Advantageous Effects of Invention

According to the present disclosure, it is possible to control the power converter by using detected pulsation. It is thus possible to reduce resonance without providing a damping resistor.

DESCRIPTION OF EMBODIMENTS

Figure 1:
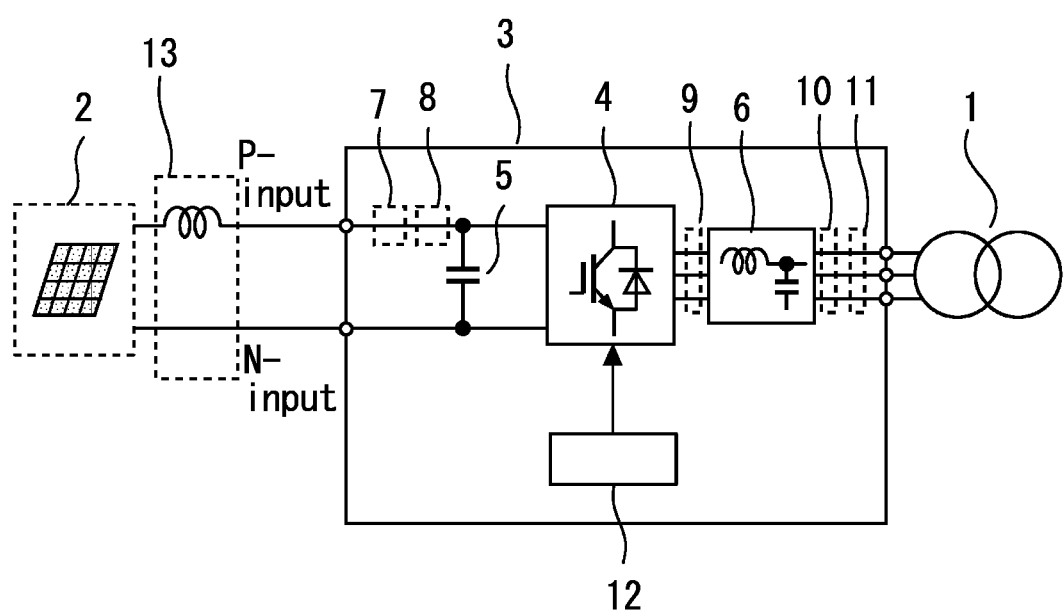
FIG. 1 is a block diagram of a power system to which a controller of a power conversion device in a first embodiment is applied.

Embodiments will be described in accordance with the accompanying drawings. In the drawings, the same or corresponding parts are denoted by the same reference numerals. The repetitive descriptions of the parts will be simplified or omitted as appropriate.

First Embodiment

FIG. 1 is a block diagram of a power system to which a controller of a power conversion device in a first embodiment is applied.

The power system of FIG. 1 includes an AC power supply 1, a DC power supply 2, and a power conversion device 3.

The AC power supply 1 is operated by an electric power company or the like. For example, the AC power supply 1 is an electric power system. The DC power supply 2 is provided outdoors. For example, the DC power supply 2 is a solar cell. The power conversion device 3 is connected between the AC power supply 1 and the DC power supply 2.

The power conversion device 3 includes a power converter 4, a capacitor 5, a filter 6, a first current detector 7, a first voltage detector 8, a second current detector 9, a second voltage detector 10, a third current detector 11, and a controller 12.

The power conversion device 3 and the DC power supply 2 are connected through a DC cable 13.

The power converter 4 is provided so as to convert a DC voltage into an AC voltage.

The capacitor 5 is provided between the DC power supply 2 and the power converter 4. The capacitor 5 is provided so as to smooth the DC voltage.

The filter 6 is provided between the power converter 4 and the AC power supply 1. The filter 6 is provided so as to reduce the harmonics of the AC current.

The first current detector 7 is provided on the input side of the capacitor 5. The first current detector 7 is provided so as to detect a value Idc of the current that is input to the capacitor 5.

The first voltage detector 8 is provided on the input side of the capacitor 5. The first voltage detector 8 is provided so as to detect a value Vdc of the voltage that is input to the capacitor 5.

The second current detector 9 is provided on the output side of the power converter 4. The second current detector 9 is provided so as to detect a value $i_{AC}$ of the current flowing on the output side of the power converter 4.

The second voltage detector 10 is provided on the input side of the AC power supply 1. The second voltage detector 10 is provided so as to detect a value $V_{Grid}$ of the voltage that is input to the AC power supply 1.

The third current detector 11 is provided on the input side of the AC power supply 1. The third current detector 11 is provided so as to detect a value $i_{Grid}$ of the current that is input to the AC power supply 1.

The controller 12 is connected to the power converter 4. The controller 12 receives the information of the detected value Idc from the first current detector 7. The controller 12 receives the information of the detected value Vdc from the first voltage detector 8. The controller 12 receives the information of the detected value $i_{AC}$ from the second current detector 9. The controller 12 receives the information of the detected values $V_{Grid}$ from the second voltage detector 10. The controller 12 receives the information of the detected value $i_{Grid}$ from the third current detector 11. The controller 12 controls the power converter 4 on the basis of the information of the detected value Vdc, the detected value $i_{AC}$, the detected value $V_{Grid}$, and the detected value $i_{Grid}$. For example, the controller 12 adjusts the power of the power converter 4 so that the pulsation component of the DC voltage is reduced.

Next, resonance on the DC side will be described with reference to FIG. 2.

Figure 2:
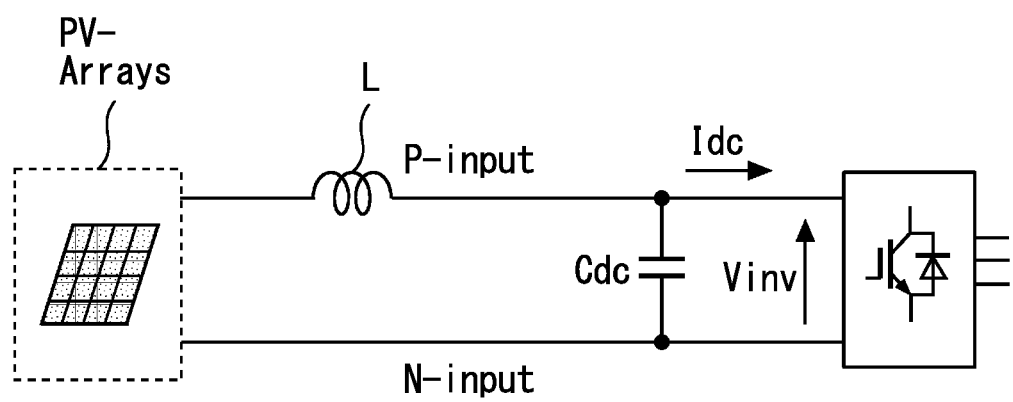
FIG. 2 is a diagram for explaining resonance on the DC side of a power conversion system to which the controller of the power conversion device in the first embodiment is applied.

FIG. 2 is a diagram for explaining resonance on the DC side of the power conversion system to which the controller of the power conversion device in the first embodiment is applied.

In FIG. 2, Cdc is the capacitance of the capacitor 5. L represents the parasitic inductance of the DC cable 13. Vinv is a DC voltage applied to the power converter 4. Idc represents a DC current flowing through the power converter 4.

In general, Idc includes pulsation associated with power conversion. Depending on the magnitude of the inductance L, a resonance frequency with the capacitance Cdc becomes close to a pulsation frequency of Idc, and resonance occurs. In this case, the DC voltage and the DC current vibrate.

Next, a control method in which the controller 12 adjusts the electric power will be described with reference to FIG. 3.

Figure 3:
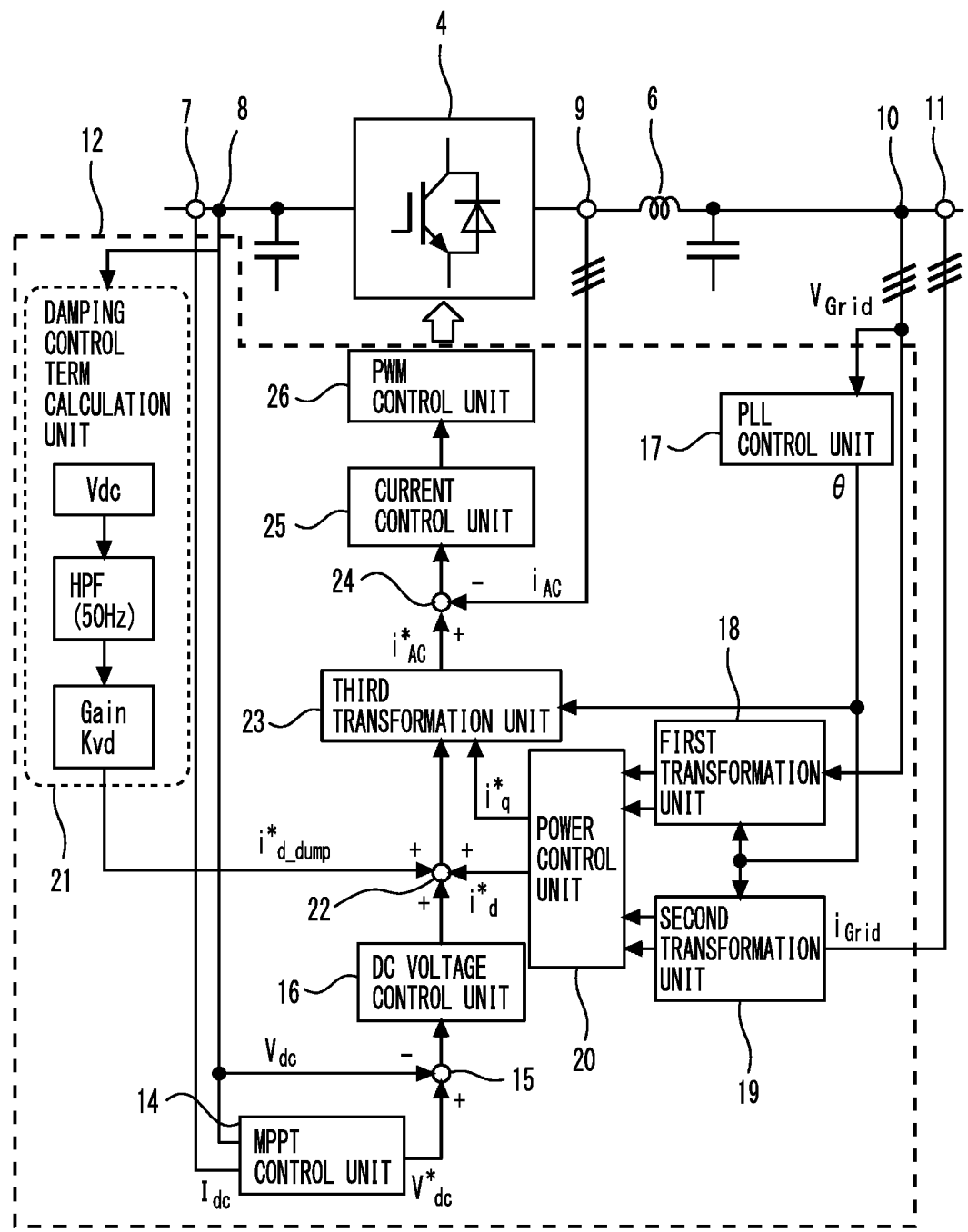
FIG. 3 is a block diagram of the controller of the power conversion device in the first embodiment.

FIG. 3 is a block diagram of the controller of the power conversion device in the first embodiment.

As shown in FIG. 3, the controller 12 includes a maximum power point tracking (MPPT) control unit 14, a first subtraction unit 15, a DC voltage control unit 16, a phase-locked loop (PLL) control unit 17, a first transformation unit 18, a second transformation unit 19, a power control unit 20, the damping control term calculation unit 21, a first addition unit 22, a third transformation unit 23, a second subtraction unit 24, a current control unit 25, and a pulse-width modulation (PWM) control unit 26.

The MPPT control unit 14 receives the input of the information of the detected value Idc from the first current detector 7. The MPPT control unit 14 receives the input of the information of the detected value Vdc from the first voltage detector 8. The MPPT control unit 14 performs MPPT control on the basis of the detected value Idc and the detected value Vdc. The MPPT control unit 14 calculates a DC voltage command value V*dc on the basis of the detected value Idc and the detected value Vdc. The MPPT control unit 14 outputs the information of the DC voltage command value V*dc.

The first subtraction unit 15 receives the input of the information of the DC voltage command value V*dc from the MPPT control unit 14. The first subtraction unit 15 receives the input of the information of the detected value Vdc from the first voltage detector 8. The first subtraction unit 15 calculates a value obtained by subtracting the detected value Vdc from the DC voltage command value V*dc. The first subtraction unit 15 outputs the information of the value obtained by subtracting the detected value Vdc from the DC voltage command value V*dc.

The DC voltage control unit 16 receives the input of the information of the output value of the first subtraction unit 15. The DC voltage control unit 16 calculates a d-axis current command value on the basis of the input value. The DC voltage control unit 16 outputs the information of the d-axis current command value.

The PLL control unit 17 receives the input of the information of the detected value $V_{Grid}$ of the second voltage detector 10. The PLL control unit 17 performs PLL control on the basis of the detected value $V_{Grid}$. The PLL control unit 17 outputs information of a reference phase θ synchronized with the detected value $V_{Grid}$.

The first transformation unit 18 receives the input of the information of the detected value $V_{Grid}$ of the second voltage detector 10. The first transformation unit 18 receives the input of the information of the reference phase θ from the PLL control unit 17. The first transformation unit 18 transforms the detected value $V_{Grid}$ into a d-axis voltage value and a q-axis voltage value by d-q transformation. Note that the q-axis voltage component is set to 0 as the reference phase of the d-q transformation. The first transformation unit 18 outputs the information of the d-axis voltage value and the information of the q-axis voltage value.

The second transformation unit 19 receives the input of the information of the detected value $i_{Grid}$ from the third current detector 11. The second transformation unit 19 receives the input of the information of the reference phase θ from the PLL control unit 17. The second transformation unit 19 transforms the detected value $i_{Grid}$ into a d-axis current value and a q-axis current value by the d-q transformation. Note that the q-axis voltage component is set to 0 as the reference phase of the d-q transformation. The second transformation unit 19 outputs the information of the d-axis current value and the information of the q-axis current value.

The power control unit 20 receives the input of the information of the d-axis voltage value and the information of the q-axis voltage value from the first transformation unit 18. The power control unit 20 receives the input of information of a d-axis current value i*d and a q-axis current value i*$_q$ from the second transformation unit 19. The power control unit 20 outputs the information of the d-axis current value i*$_d$ and the information of the q-axis current value i*$_q$.

The damping control term calculation unit 21 receives the input of the information of the detected value Vdc from the first voltage detector 8. The damping control term calculation unit 21 calculates a voltage pulsation Δv of the capacitor by applying a high-pass filter to the detected value Vdc. The damping control term calculation unit 21 calculates a damping control term i*$_{d\_dump}$ by multiplying the voltage pulsation value Δv by a preset control gain Kvd. The damping control term calculation unit 21 outputs the information of the value of the damping control term.

The first addition unit 22 receives the input of the information of the d-axis current command value from the DC voltage control unit 16. The first addition unit 22 receives the input of the information of the d-axis current value i*$_d$ from the power control unit 20. The first addition unit 22 receives the input of the information of the value of the damping control term from the damping control term calculation unit 21. The first addition unit 22 adds the d-axis current value i*$_d$ and the value of the damping control term to the d-axis current command value. The first addition unit 22 outputs the information of the value obtained by the addition.

The third transformation unit 23 receives the input of the information of the reference phase θ from the PLL control unit 17. The third transformation unit 23 receives the input of the information of the i*$_q$ of the q-axis current value from the power control unit 20. The third transformation unit 23 receives the input of the information of the calculated value from the first addition unit 22. The third transformation unit 23 performs inverse d-q transformation on the input value to calculate each phase current command value i*$_{AC}$. The third transformation unit 23 outputs the information of each phase current command value i*$_{AC}$.

The second subtraction unit 24 receives the input of the information of the detected value i$_{AC}$ from the second current detector 9. The second subtraction unit 24 receives the input of the information of each phase current command value i*$_{AC}$ from the third transformation unit 23. The second subtraction unit 24 subtracts the value of the detected value i$_{AC}$ from the value of the detected value i*$_{AC}$. The second subtraction unit 24 outputs the information of the value obtained by the subtraction.

The current control unit 25 receives the input of the information of the calculated value from the second subtraction unit 24. The current control unit 25 calculates a voltage command value on the basis of the input value. The current control unit 25 outputs the information of the voltage command value.

The PWM control unit 26 receives the input of the information of the voltage command value from the current control unit 25. The PWM control unit 26 performs PWM control on the power converter 4 on the basis of the voltage command value. For example, the PWM control unit 26 outputs, to the power converter 4, a gate signal for performing the PWM control on the power converter 4 on the basis of the voltage command value.

Next, the concept of the damping control term will be described with reference to FIG. 4.

Figure 4:
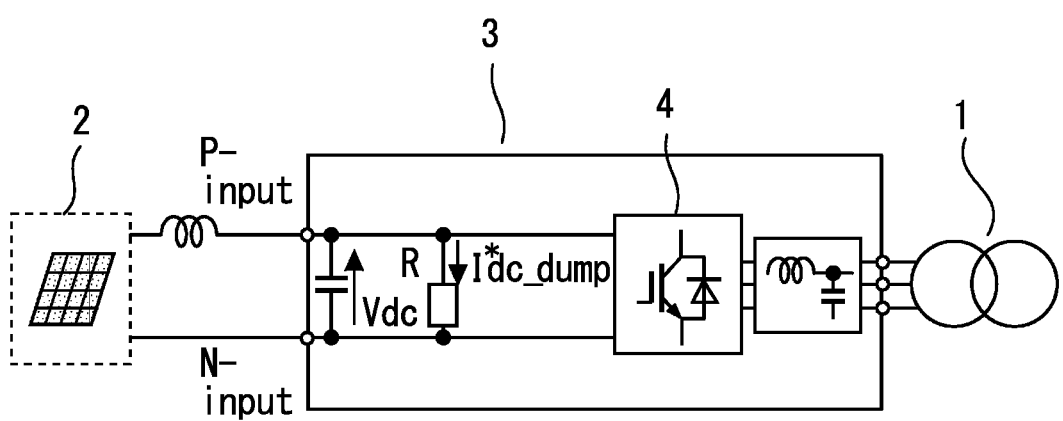
FIG. 4 is a conceptual diagram in a case where a damping resistor is provided in parallel in a DC circuit of the power conversion device to which the controller of the power conversion device in the first embodiment is applied.

FIG. 4 is a conceptual diagram in a case where a damping resistor is provided in parallel in a DC circuit of the power conversion device to which the controller of the power conversion device in the first embodiment is applied.

By using the damping control term i*$_{d\_dump}$ described in FIG. 3, the current i*$_{dc\_dump}$ shown in Equation (1) below is added to the DC side of the power converter 4.

$$I^*_{dc\_dump} = vd \times i^*_{d\_dump}/VdC \quad (1)$$

In Equation (1), vd is the d-axis voltage of the AC voltage. When i*$_{d\_dump}$=Kvd×ΔVdc is substituted into Equation (1), Equation (2) below is obtained.

$$I^*_{dc\_dump} = vd \times Kvd/Vdc \times \Delta Vdc \quad (2)$$

In Equation (2), ΔVdc is the voltage pulsation of the capacitor.

Here, vd is the d-axis voltage of the AC voltage and Vdc is the DC voltage, and can thus be considered to be almost constant. When 1/R=vd×Kvd/Vdc, Equation (3) below is obtained.

$$I^*_{dc\_dump} = 1/R \times \Delta Vdc \quad (3)$$

In regard to the pulsation component, the damping control shown in FIG. 3 is equivalent to providing the damping resistor in parallel in the DC circuit of the power conversion device as shown in FIG. 4. Therefore, the pulsation-reducing effect is obtained as in the case where the damping resistor is provided.

Next, simulation results of the switching of the DC voltage damping control will be described with reference to FIGS. 5 and 6.

Figure 5:
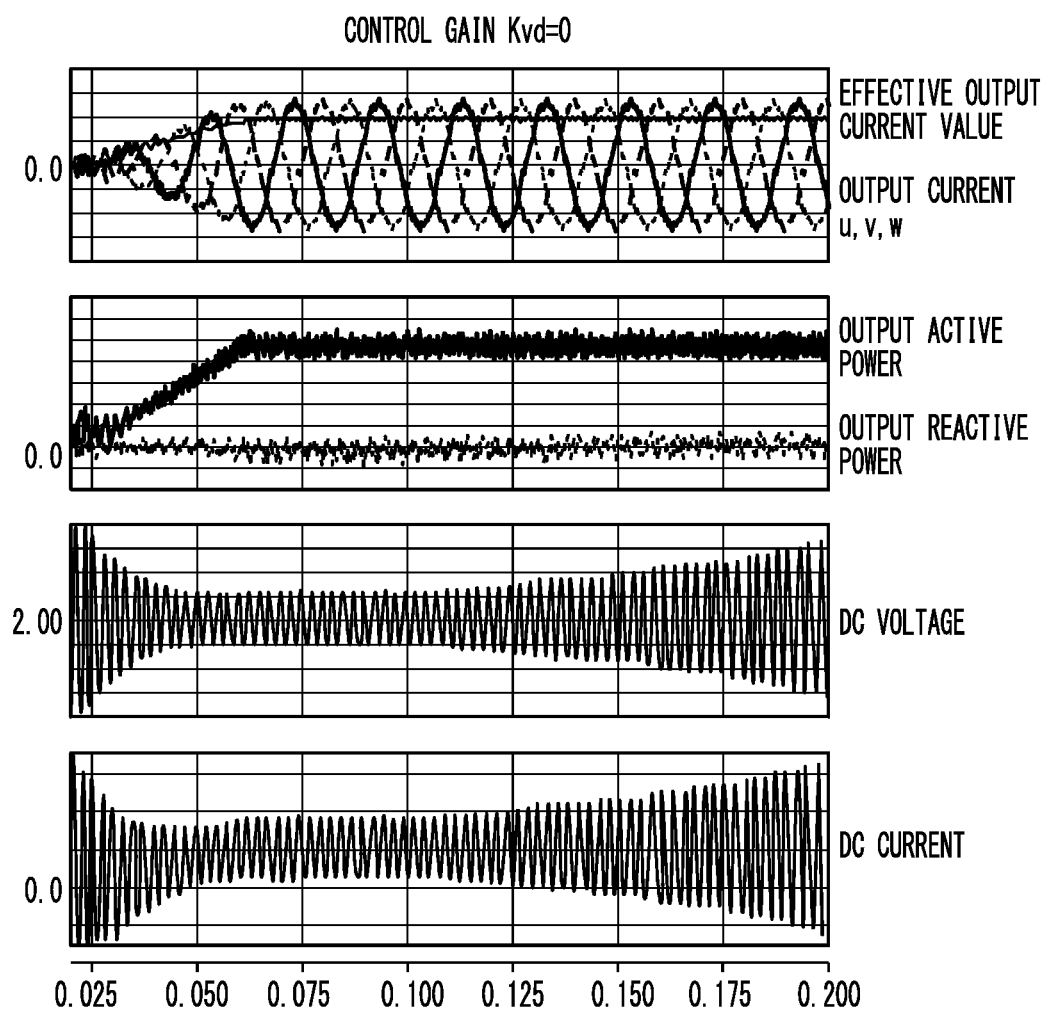
FIG. 5 is a diagram showing simulation results of the controller of the power conversion device in the first embodiment.
Figure 6:
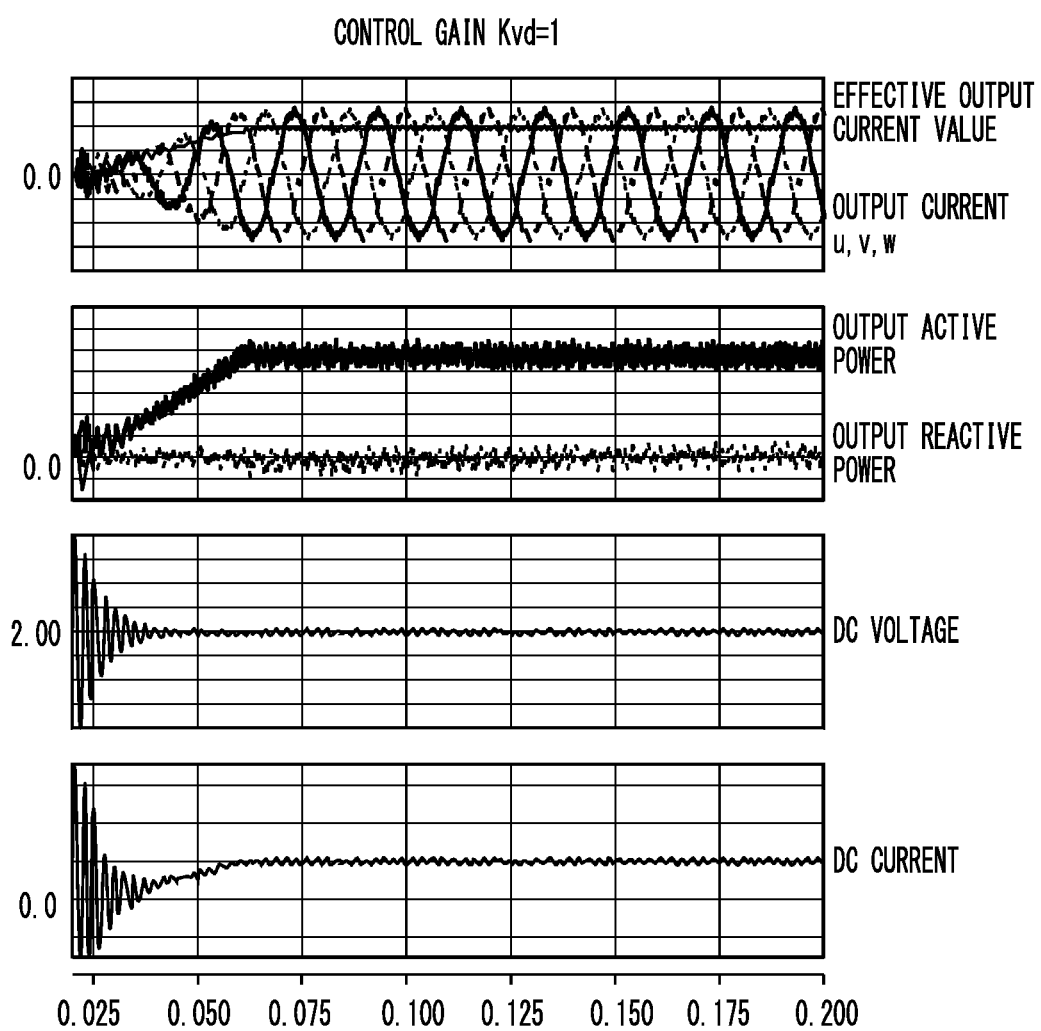
FIG. 6 is a diagram showing simulation results of the controller of the power conversion device in the first embodiment.

FIGS. 5 and 6 are diagrams showing the simulation results of the controller of the power conversion device in the first embodiment.

FIG. 5 shows simulation results when the control gain Kvd is 0. The top graph is a graph showing an effective output current value and output currents of a U-phase, a V-phase, and a W-phase. The second graph from the top is a graph showing output active power and output reactive power. The third graph from the top is a graph showing a DC voltage. The bottom graph is a graph showing a DC current.

In FIG. 5, when the output current, the output active power, and the output reactive power are each output as shown in the top graph and the second graph from the top, pulsation occur in the DC voltage and the DC current as shown in the third graph from the top and the bottom graph.

FIG. 6 shows simulation results when the control gain Kvd is 1. The top graph is a graph showing an effective output current value and output currents of a U-phase, a V-phase, and a W-phase. The second graph from the top is a graph showing output active power and output reactive power. The third graph from the top is a graph showing a DC voltage. The bottom graph is a graph showing a DC current.

In FIG. 6, as shown in the top graph and the second graph from the top, the output current, the output active power, and the output reactive power are each output as in FIG. 5. As shown in the third graph from the top and the bottom graph, the pulsation is reduced in the DC voltage and the DC current.

Next, with reference to FIG. 7, an example of the controller 12 will be described.

Figure 7:
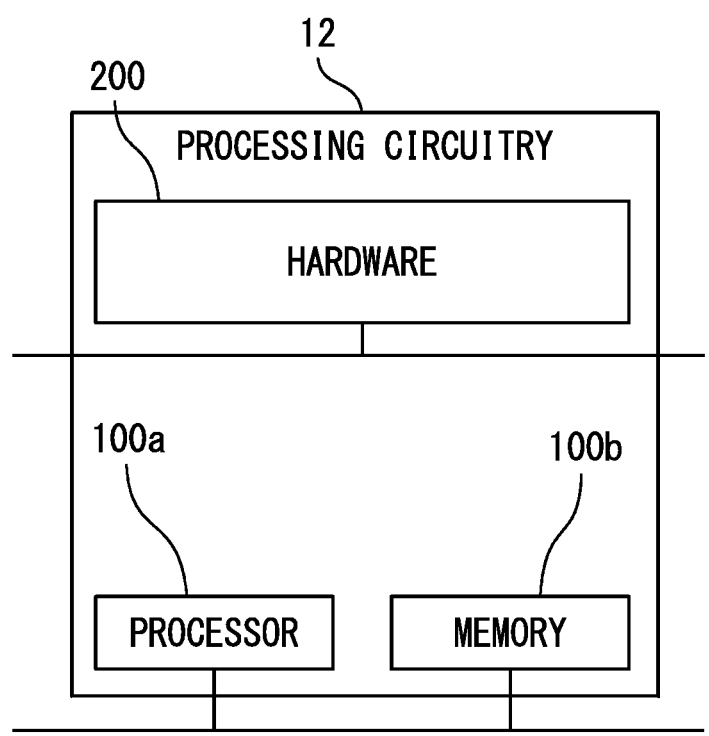
FIG. 7 is a hardware block diagram of the controller of the power conversion device in the first embodiment.

FIG. 7 is a hardware block diagram of the controller of the power conversion device in the first embodiment.

Each function of the controller 12 can be realized by processing circuitry. For example, the processing circuitry includes at least one processor 100*a* and at least one memory 100*b*. For example, the processing circuitry includes at least one dedicated hardware 200.

When the processing circuitry includes at least one processor 100*a* and at least one memory 100*b*, each function of the controller 12 is realized by software, firmware, or a combination of the software and the firmware. At least one of the software and the firmware is described as a program. At least one of the software and the firmware is stored into at least one memory 100*b*. At least one processor 100*a* reads out and executes the program stored in at least one memory 100*b*, thereby realizing each function of the controller 12. At least one processor 100*a* is also referred to as a central processing unit, a processing unit, an arithmetic unit, a microprocessor, a microcomputer, or a digital signal processor (DSP). For example, at least one memory 100*b* may be a non-volatile or volatile semiconductor memory, such as random-access memory (RAM), read-only memory (ROM), flash memory, erasable programmable ROM (EPROM), or electrically erasable programmable ROM (EEPROM), a magnetic disk, a flexible disk, an optical disk, a compact disk, a mini-disk, a digital versatile disc (DVD), or the like.

When the processing circuitry includes at least one dedicated hardware 200, the processing circuitry is realized by, for example, a single circuit, a composite circuit, a programmed processor, a parallel programmed processor, an application-specific integrated circuit (ASIC), a field-programmable gate array (FPGA), or a combination thereof. For example, the functions of the controller 12 are each realized by the processing circuitry. For example, the functions of the controller 12 are collectively realized by the processing circuitry.

Some of the functions of the controller 12 may be realized by the dedicated hardware 200, and the others may be realized by the software or the firmware. For example, some functions of the controller 12 may be realized by the processing circuitry as the dedicated hardware 200, and the other functions of the controller 12 may be realized by at least one processor 100a reading and executing the program stored in at least one memory 100b.

In this manner, the processing circuitry realizes each function of the controller 12 by the hardware 200, the software, the firmware, or a combination thereof.

According to the first embodiment described above, the controller 12 adjusts the power of the power converter 4 so that the pulsation component of the DC voltage is reduced. It is thus possible to reduce resonance without providing a damping resistor.

The controller 12 calculates a d-axis current command value by using the voltage pulsation of the capacitor 5 and controls the power converter 4. Therefore, the pulsation can be reduced as in the case where the damping resistor is provided in parallel on the DC side of the power conversion device 3.

Specifically, an amount proportional to a DC voltage $\Delta v$ is added to the power of the power converter 4. Thus, a DC current $\Delta i$ added on the DC side of the power converter 4 is substantially proportional to $\Delta v$. Therefore, it is possible to obtain a damping effect on a high-frequency component, the effect being similar to that in the case where the damping resistor is provided in parallel on the DC side of the power converter 4.

When the resonance having occurred between the capacitor 5 and the inductance L is large, depending on the magnitude of the inductance on the DC side, the power conversion device 3 may detect a DC overvoltage and come to a protective stop. In contrast, according to the first embodiment, the pulsation of the DC voltage is reduced, whereby the occurrence of the protective stop can be prevented.

In the power system, also, when a system disturbance such as an instantaneous voltage drop or an instantaneous power failure occurs, a Fault Ride Through function is required to continue the operation of the power converter 4. When a sudden change occurs in the phase and amplitude of the system voltage, the output power or the DC voltage of the power converter 4 changes suddenly. As a result, the power conversion device 3 may detect an overvoltage and come to a protective stop. In contrast, according to the first embodiment, the pulsation of the DC voltage is reduced, whereby the occurrence of the protective stop can be prevented.

When harmonics are included in the system voltage and the power converter 4 outputs a fundamental current, the power which is the product of the voltage and the current has pulsation of a frequency component which is the sum and difference of the frequency of the harmonics of the system voltage and the fundamental frequency of the output current. Therefore, the DC voltage may pulsate. As a result, the ripple current of the capacitor 5 in the power conversion device 3 increases, which may cause a loss of a margin for the ripple current rating or an increase in temperature. In contrast, according to the first embodiment, such phenomena can be prevented by reducing the pulsation of the DC voltage.

It has been described in FIG. 2 that the resonance occurs between the parasitic inductance of the DC cable 13 and the capacitor 5, but a DC reactor may be provided between the power converter 4 and the DC power supply in order to remove the switching ripples of the power converter 4. In this case, resonance may occur between the DC reactor and the capacitor 5. In contrast, according to the first embodiment, the damping control by the controller 12 can reduce the pulsation of the DC voltage.

In the first embodiment, the example of the case where the DC power supply is the solar cell has been shown. However, also in the case of a DC power supply except for the solar cell, the pulsation of the DC voltage can be reduced by a controller similar to the controller 12. In this case as well, a similar reduction in pulsation can be realized by adding, to the d-axis current command value or the AC power command value, a value obtained by multiplying the DC voltage pulsation component, obtained by applying a high-pass filter to the measured DC voltage value, by a control gain.

Second Embodiment

Figure 8:
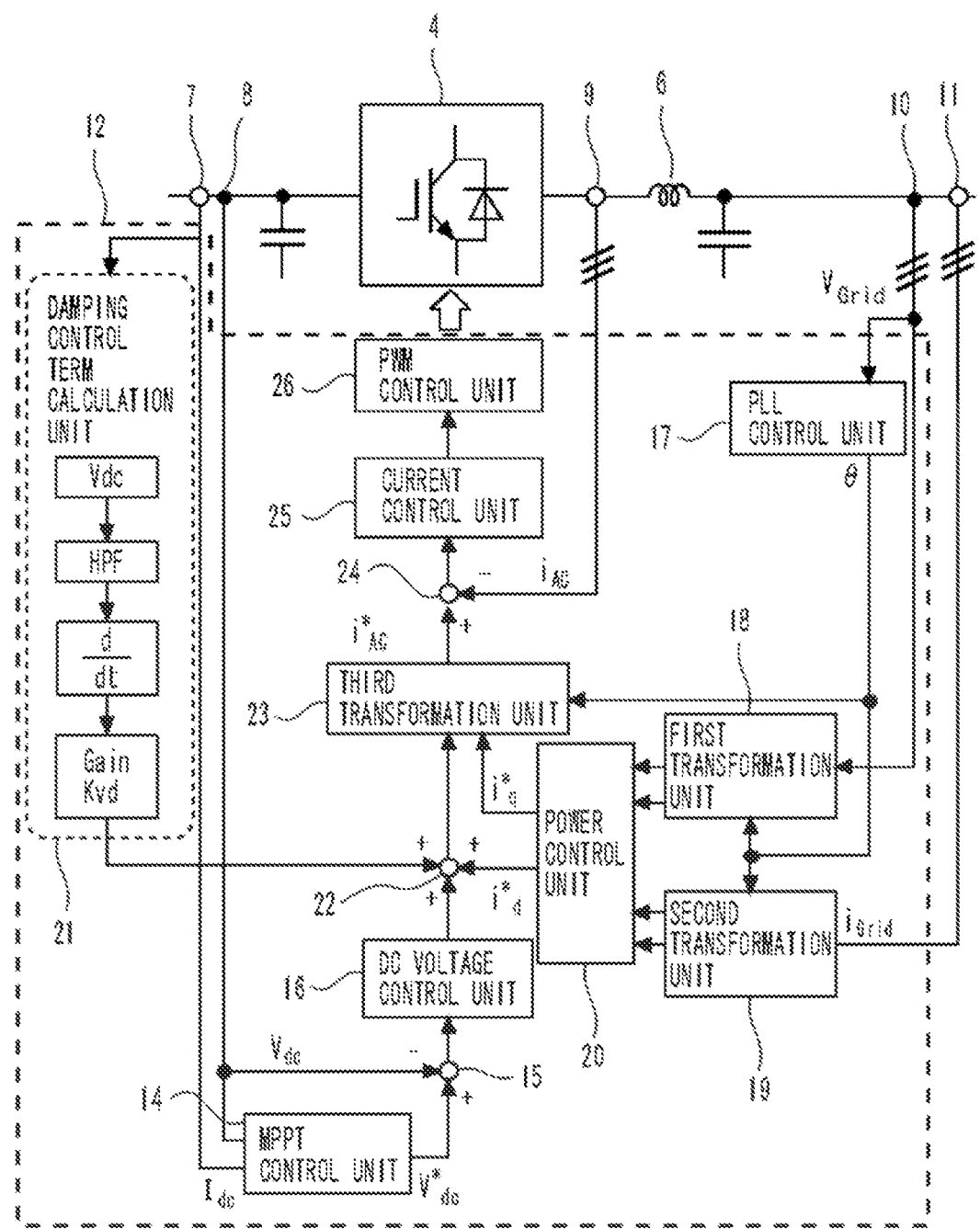
FIG. 8 is a block diagram of a controller of a power conversion device in a second embodiment.

FIG. 8 is a block diagram of a controller of a power conversion device in a second embodiment. Note that the same or corresponding parts as those of the first embodiment are denoted by the same reference numerals. The descriptions of the parts will be omitted.

As shown in FIG. 8, the damping control term calculation unit 21 receives the input of the information of the detected value Idc from the first current detector 7. The damping control term calculation unit 21 calculates a pulsation component $\Delta i1$ by applying a high-pass filter to the detected value Idc. The damping control term calculation unit 21 differentiates $\Delta i1$ with time. The damping control term calculation unit 21 calculates a damping control term by multiplying the value, obtained by differentiating $\Delta i1$ with time, by a preset control gain Kvd. The damping control term calculation unit 21 outputs the information of the damping control term.

According to the second embodiment described above, the controller 12 adjusts the power of the power converter 4 so that the pulsation component of the DC current is reduced. It is thus possible to reduce resonance without providing a damping resistor.

The controller 12 controls the power converter 4 on the basis of the command value of the AC current calculated using the value obtained by differentiating the pulsation component value of the DC current with time. Hence the pulsation can be reduced as in a case where the damping resistor is provided in series on the DC side of the power conversion device 3.

Specifically, an amount proportional to the DC current $\Delta i1$ is added to the power of the power converter 4. Thus, a DC current $\Delta i2$ added on the side closer to the power converter 4 than the capacitor 5 is substantially proportional to $\Delta i1$. By charging the capacitor 5 with $\Delta i2$, the voltage pulsation $\Delta v$ of the capacitor 5 is substantially proportional to the integral of Δi2. As a result, Δv is substantially proportional to Δi1. Therefore, it is possible to obtain a damping effect on a high-frequency component, the effect being similar to that in the case where the damping resistor is provided in series on the DC side of the power conversion device 3.

Third Embodiment

Figure 9:
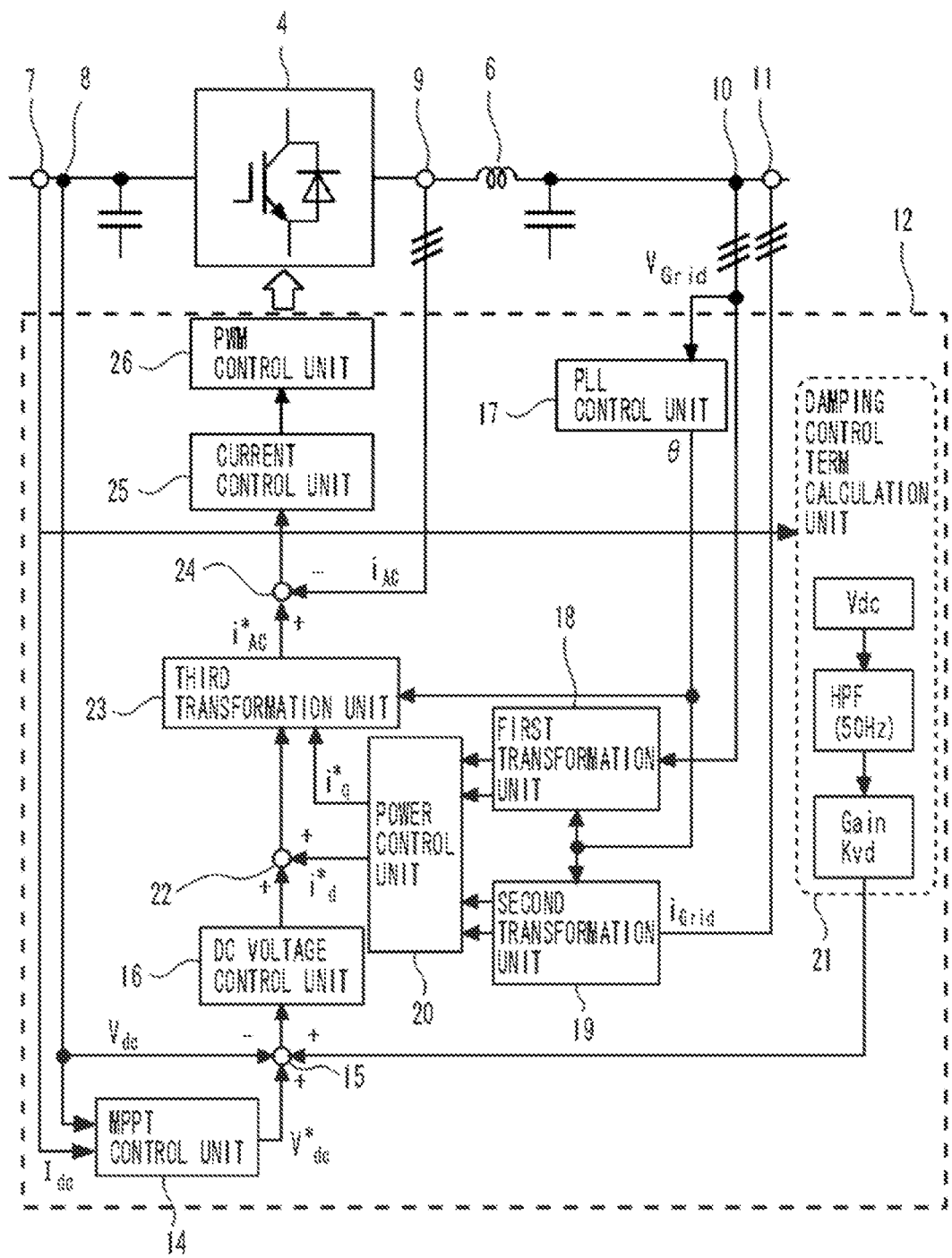
FIG. 9 is a block diagram of a controller of a power conversion device in a third embodiment.

FIG. 9 is a block diagram of the controller 12 of the power conversion device 3 in a third embodiment. Note that the same or corresponding parts as those of the first embodiment are denoted by the same reference numerals. The descriptions of the parts will be omitted.

As shown in FIG. 9, the damping control term calculation unit 21 receives the input of the information of the detected value Idc from the first current detector 7. The damping control term calculation unit 21 calculates a pulsation component Δi1 by applying a high-pass filter to the detected value Idc. The damping control term calculation unit 21 calculates a damping control term by multiplying Δi1 by a preset control gain Kid.

The first subtraction unit 15 receives the input of the information of the DC voltage command value V*dc from the MPPT control unit 14. The first subtraction unit 15 receives the input of the information of the detected value Vdc from the first voltage detector 8. The first subtraction unit 15 receives the input of the information of the damping control term from the damping control term calculation unit 21. The first subtraction unit 15 calculates a value obtained by subtracting the detected value Vdc from a value obtained by adding the DC voltage command value V*dc and the damping control term. The first subtraction unit 15 outputs information of a value obtained by subtracting the detected value Vdc from the value obtained by adding the DC voltage command value V*dc and the damping control term.

Next, the concept of the damping control term will be described with reference to FIG. 10.

Figure 10:
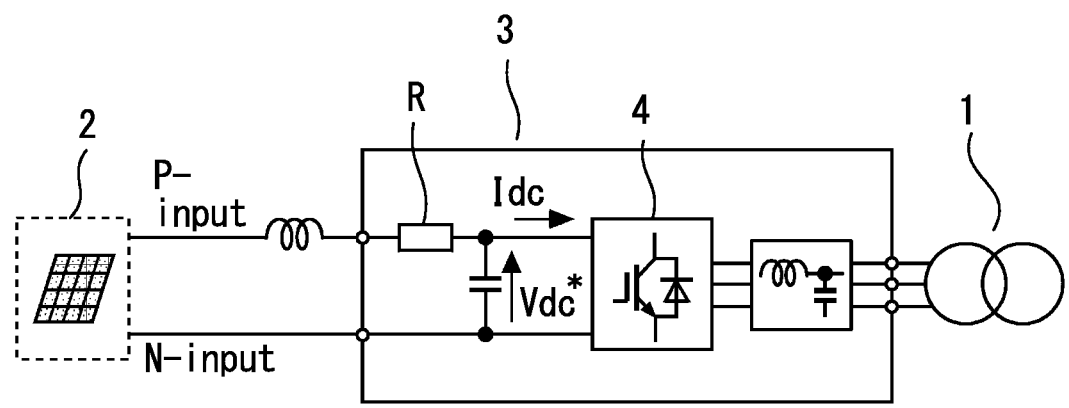
FIG. 10 is a conceptual diagram in a case where a damping resistor is provided in series in a DC circuit of the power conversion device to which the controller of the power conversion device in the third embodiment is applied.

FIG. 10 is a conceptual diagram in a case where the damping resistor is provided in series in the DC circuit of the power conversion device to which the controller of the power conversion device in the third embodiment is applied.

In the conceptual diagram of FIG. 10, Equation (4) below holds. The damping control term calculation unit 21 (not shown in FIG. 10) calculates a damping control term on the basis of Equation (4).

$$Vdc^* = Kid \times \Delta Idc \quad (4)$$

In Equation (4), Vdc* is a voltage. Kid is a control gain. ΔIdc is a current pulsation.

According to the third embodiment described above, the controller 12 controls the power converter 4 on the basis of the command value of the DC voltage calculated using the pulsation component value of the DC current. It is thus possible to reduce resonance without providing a damping resistor.

INDUSTRIAL APPLICABILITY

As described above, the controller of the power conversion device of the present disclosure can be used for a power system.

REFERENCE SIGNS LIST

1 AC power supply
2 DC power supply
3 Power conversion device
4 Power converter
5 Capacitor
6 Filter
7 First current detector
8 First voltage detector
9 Second current detector
10 Second voltage detector
11 Third current detector
12 Controller
13 DC cable
14 MPPT control unit
15 First subtraction unit
16 DC voltage control unit
17 PLL control unit
18 First transformation unit
19 Second transformation unit
20 Power control unit
21 Damping control term calculation unit
22 First addition unit
23 Third transformation unit
24 Second subtraction unit
25 Current control unit
26 PWM control unit
100a Processor
100b Memory
200 Hardware
R Resistor

The invention claimed is:

1. A controller of a power conversion device, the power conversion device including a power converter connected between a direct current (DC) power supply and an alternating current (AC) power supply, the controller comprising:
a damping control term calculation unit configured to calculate a value of pulsation of a DC voltage applied between the DC power supply and the power converter, or pulsation of a DC current flowing between the DC power supply and the power converter; and
a current control unit configured to output, to the power converter, a command value for adjusting power of the power converter on a basis of a command value of AC current, calculated using a value obtained by differentiating a pulsation component value of the DC current with time, so that the pulsation component corresponding to the pulsation value calculated by the damping control term calculation unit is reduced in accordance with a command value based on the value calculated by the damping control term calculation unit.

* * * * *